Nov. 28, 1967 K. SPOHN ET AL 3,354,763
MACHINE TOOL
Filed Dec. 2, 1965 5 Sheets-Sheet 1
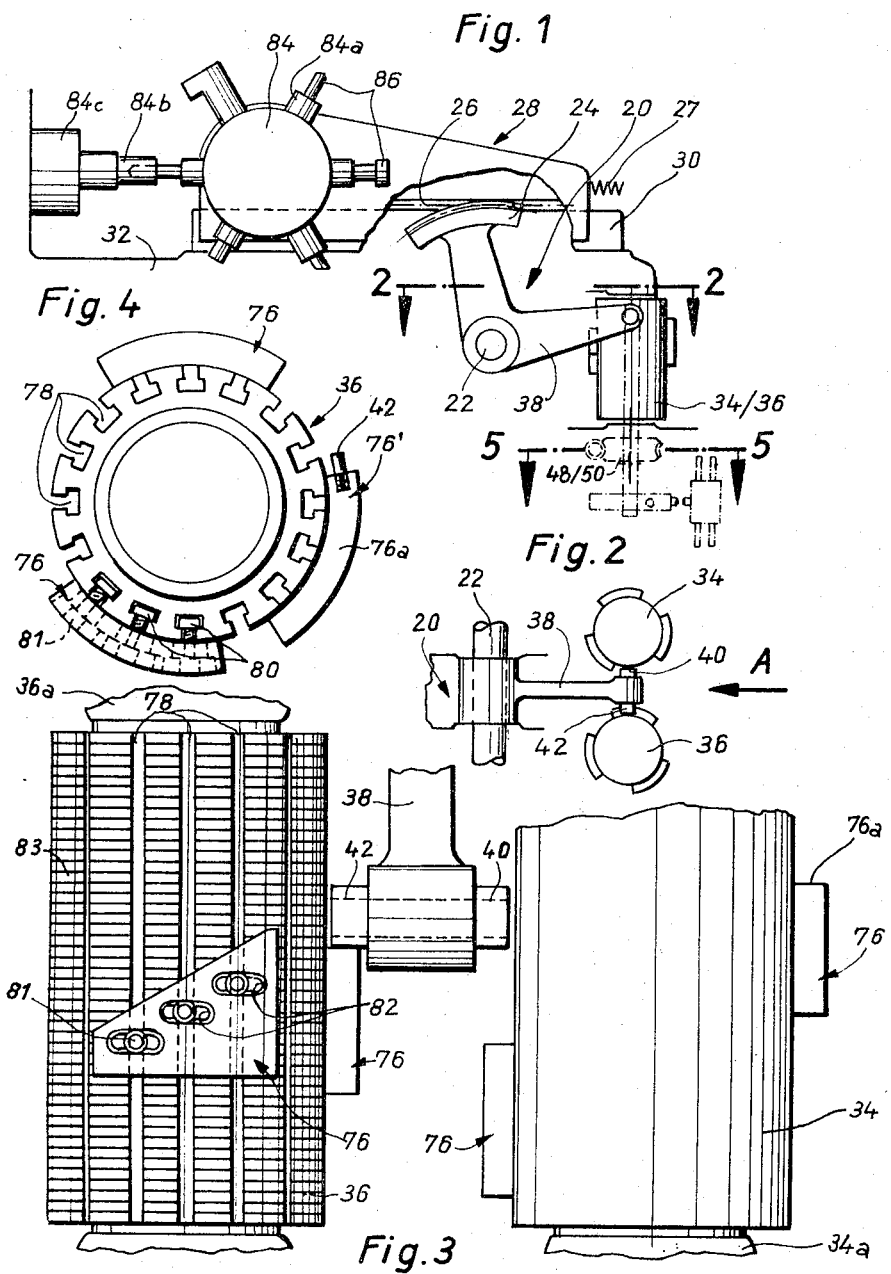
Inventors
Karl Spohn
Gerhard Foll
by Michael S. Striker
Atty

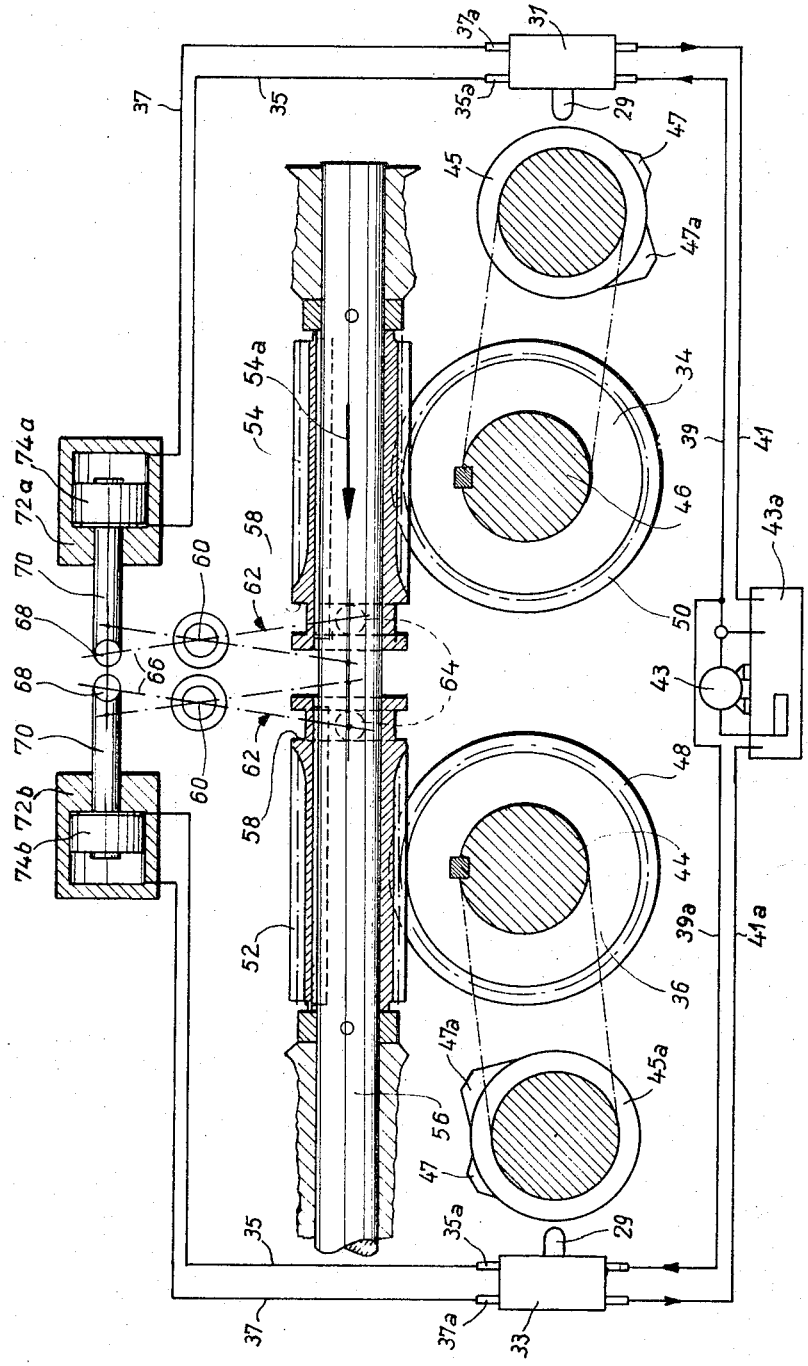

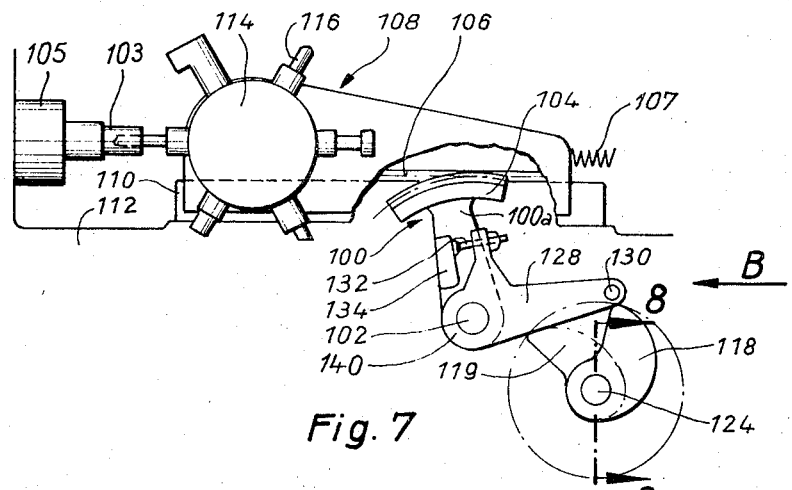
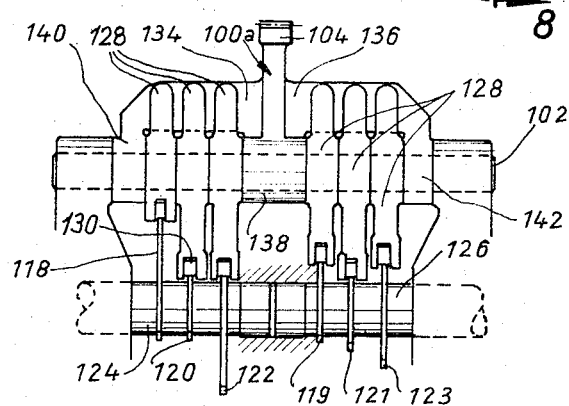

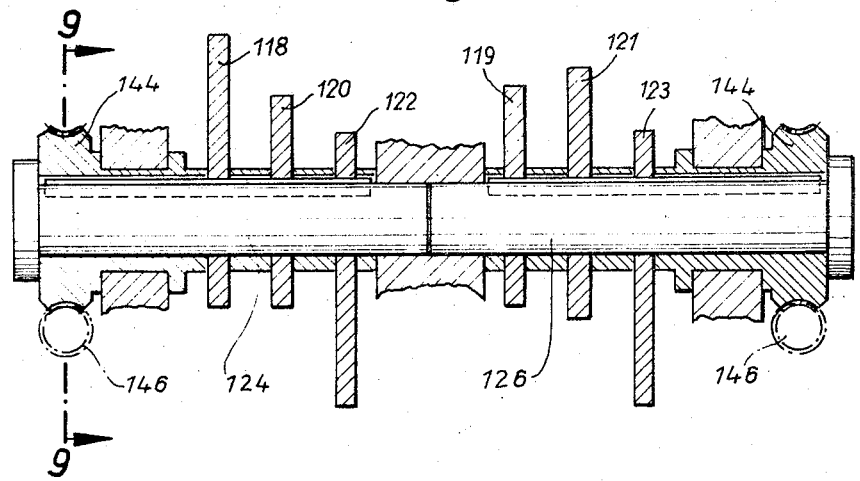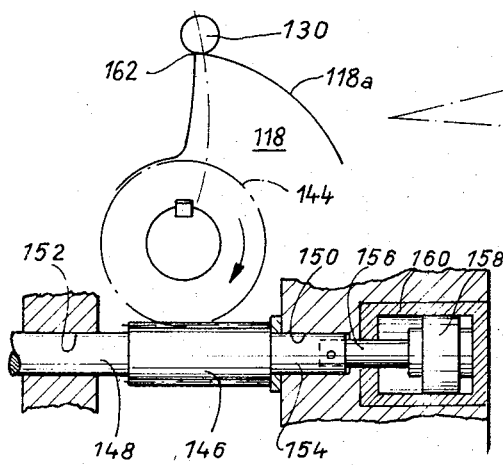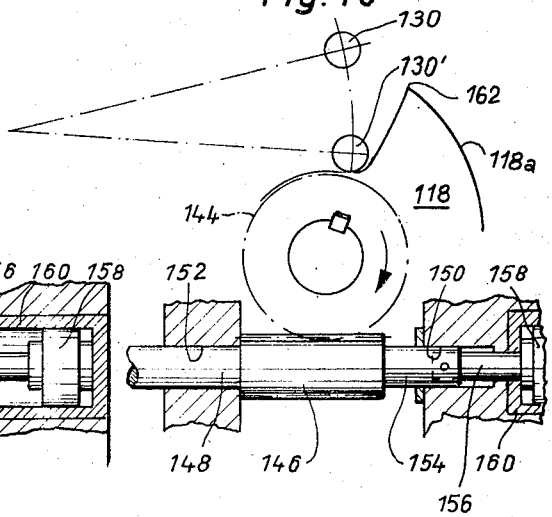

Nov. 28, 1967   K. SPOHN ET AL   3,354,763
MACHINE TOOL

Filed Dec. 2, 1965   5 Sheets-Sheet 5

Inventors
Karl Spohn
Gerhard Föll
by Michael J. Striker
Atty

United States Patent Office 3,354,763
Patented Nov. 28, 1967

3,354,763
MACHINE TOOL
Karl Spohn and Gerhard Foll, Esslingen, Germany, assignors to Index-Werke K.G. Hahn & Tessky, Esslingen (Neckar), Germany
Filed Dec. 2, 1965, Ser. No. 511,069
Claims priority, application Germany, Dec. 5, 1964, J 27,056
20 Claims. (Cl. 82—21)

The present invention relates to machine tools in general, and more particularly to an apparatus for feeding a reciprocable tool support in a turret lathe in or an analogous machine tool. Still more particularly, the invention relates to an apparatus for feeding the turret-supporting slide of a turret lathe at a plurality of speeds and in a predetermined sequence to thereby move each of a series of turret-supported tools into requisite engagement with a workpiece.

It is already known to utilize in a turret lathe a single programming cam which controls movements of two or more tools into engagement with a workpiece. A serious drawback of such machine tools is that the programming cam may be used solely for a single setup so that the machine must be furnished with a large number of differently configurated cams each of which determines the sequence of feeds for a given setup.

In accordance with a more recent proposal, the turret lathe comprises a programming unit which is composed of several individual cams mounted on a common cam shaft and capable of being adjusted with reference to the shaft so that the operators may change the set up merely by adjusting the position and/or the sequence of cams. The feeder which tracks the cams in a predetermined sequence is operatively connected with the slide for the turret head and causes the slide to feed the tools into engagement with the workpiece. Such programming units also exhibit several serious drawbacks, particularly as regards the length of intervals between consecutive feed strokes of the slide. This is due to the fact that, when the follower of the feeder reaches the end of the cam face on a preceding cam, it requires some time to move clear of such cam face and to advance into engagement with the cam face of the next cam. When added up, such intervals take up a considerable percentage of the total time during which the machine tool is in actual use. As a rule, the cam shaft which is driven at a constant speed must complete a full revolution for each individual cam and the angle described by the cam shaft subsequent to completion of a preceding feed stroke and prior to start of the next feed stroke must be large enough to allow for such relative displacement between the preceding cam and the follower of the feeder as will at least correspond to the radius of the follower.

Accordingly, it is an important object of the present invention to provide a machine tool wherein a feeder is capable of moving a tool-supporting slide from a starting position to a plurality of additional positions and to construct the programming unit which controls the working strokes of the feeder in such a way that the length of intervals during which the feeder is idle is reduced to a minimum without in any way affecting the accuracy of feed.

Another object of the invention is to provide a novel programming unit which may be utilized in a machine tool of the just outlined characteristics and to construct and assemble the programming unit in such a way that the length of intervals between consecutive feed strokes of the slide is just sufficient to allow for rapid indexing of a turret head to a different angular position and to allow for rapid return movement of the slide to starting position.

A further object of the invention is to provide a programming unit which can be rapidly and conveniently adjusted to operate the feeder in accordance with any desired schedule.

An additional object of the instant invention is to provide a programming unit which can be readily installed in presently known turret lathes and other types of machine tools wherein a slide must be fed from a starting position to a plurality of additional positions.

A concomitant object of our invention is to provide a programming unit which occupies little room, which can be operated in a fully automatic way, and which can cause the feeder to carry out two or more different feed strokes.

Another object of the invention is to provide a novel feeder which may be utilized in a turret lathe or in an analogous machine tool to transmit motion from the programming unit to the tool-supporting slide or another reciprocable component of the machine tool.

Briefly stated, one feature of our present invention resides in the provision of a machine tool, particularly a turret lathe, which comprises a reciprocable slide or another component movable in suitable ways between a starting position and a plurality of additional positions, an indexible tool-supporting head mounted on and reciprocable with the slide so that it is fed to a different extent in response to movement of the slide from starting position to each of the additional positions, a pair of rotary programming members, cam means provided on each of the programming members and each arranged to move the slide to one of the additional positions, feeder means drivingly connected with the slide and having follower means for tracking one of the cam means at a time, means for biasing the slide to starting position and for urging the follower means into engagement with one of the cam means, first drive means for rotating the programming members at a first speed during movement of the slide from starting position to an additional position, and second drive means for rotating the programming members independently of each other and at a speed exceeding the first speed whenever the slide assumes an additional position to rapidly disengage the follower means from the respective cam means so that the slide may follow the action of the biasing means. The cam means are positioned in such a way that the follower means is compelled to move from engagement with the cam means on one programming member to engagement with the cam means on the other programming member whenever the one programming member is rotated by the second drive means. This insures that the length of intervals between engagement of follower means with consecutive cam means is reduced to a minimum.

The novel features which are considered as characteristic of the invention are set forth in particular in the appended claims. The improved machine tool itself, however, both as to its construction and its mode of operation, together with additional features and advantages thereof, will be best understood upon perusal of the following detailed description of certain specific embodiments with reference to the accompanying drawings, in which:

FIG. 1 is a somewhat schematic top plan view of a portion of a turret lathe which embodies one form of our invention and wherein the programming unit comprises a pair of rotary drums;

FIG. 2 is a fragmentary horizontal section substantially as seen in the direction of arrows from the line 2—2 of FIG. 1 and illustrates the programming drums in top plan view;

FIG. 3 is an enlarged side elevational view of the programming drums, substantially as seen in direction of the arrow A in FIG. 2, a portion of the right-hand drum being broken away;

FIG. 4 is a top plan view of one of the programming drums shown in FIG. 3;

FIG. 5 is an enlarged vertical section substantially as seen in the direction of arrows from the line 5—5 of FIG. 1 and illustrates the second drive which effects rapid rotation of the programming drums;

FIG. 6 is a diagrammatic fragmentary top plan view of a modified turret lathe wherein the programming unit comprises two coaxial shafts;

FIG. 7 is an enlarged side elevational view substantially as seen in the direction of the arrow B in FIG. 6;

FIG. 8 is an enlarged vertical section substantially as seen in the direction of arrows from the line 8—8 of FIG. 6;

FIG. 9 is a section as seen in the direction of arrows from the line 9—9 of FIG. 8;

FIG. 10 illustrates the structure of FIG. 9 in a different position of adjustment;

Figure 11:
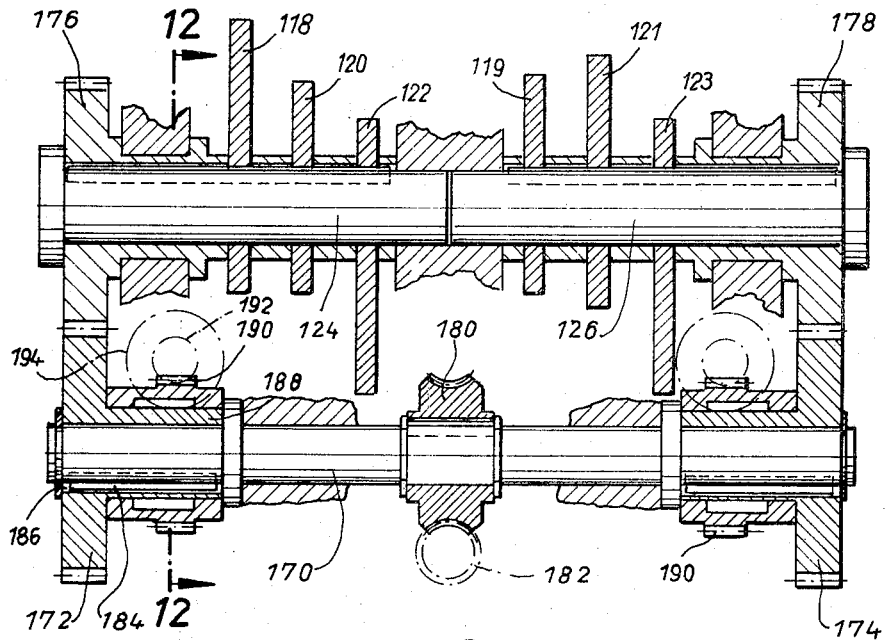
FIG. 11 is a section similar to that of FIG. 8 but showing a portion of a third turret lathe.

Referring first to FIGS. 1 to 5, there is shown a turret lathe which comprises a frame or bed 32 provided with elongated horizontal ways 30 for a movable component here shown as a reciprocable slide 28. A strong return spring 27 or an analogous device biases the slide 28 to a starting position, i.e., in a direction to the right as the parts appear in FIG. 1. The slide 28 is provided with an elongated toothed rack 26 which is parallel with the ways 30 and meshes with an arcuate toothed segment or pinion 24 forming part of a rockable feeder 20. This feeder resembles a two-armed bell crank lever one arm of which carries the segment 24 and the other arm 38 of which constitutes a tracking member and carries two coaxial roller followers 40, 42. The feeder 20 is rockable about the vertical axis of a pivot pin 22 which is fixed to the frame 32. The slide 28 supports an indexible turret head 84 which carries a total of six radially extending tool holders 84a each adapted to receive a tool 86. A chuck 84c supports a workpiece 84b which is shown in engagement with one of the tools 86. In other words, FIG. 1 shows the slide 28 in one of several additional positions each of which is spaced from the aforementioned starting position. The turret head 84 is indexible in a manner well known from the art of turret lathes.

The programming unit comprises two programming drums 34, 36 which are rotatable about parallel horizontal axes and define between themselves a gap (see FIG. 3) which can accommodate the tracking member 38 of the feeder 20. The drums 34, 36 are mounted in suitable bearings 34a, 36a and are normally rotated by a first drive including a worm shaft 56 (see FIG. 5) carrying two worms 52, 54. These worms respectively mesh with worm wheels 48, 50 provided on the lower end portions of the drums 34, 36. The worm shaft 56 is journalled in the frame 32 and supports the worms 52, 54 in such a way that each worm can move axially but is compelled to share all angular movements of the shaft 56. The shaft 56 is driven by a transmission which receives motion from a control shaft or main shaft of the turret lathe in a manner well known in the art. The drums 34, 36 are mounted on shafts 44, 46.

The adjoining end portions of the worms 52, 54 are provided with circumferential grooves 58 each of which receives a follower 64 provided at one end of a two-armed shifter lever 62. The levers 62 are fulcrumed at 60 and their second arms 66 are coupled at 68 to a pair of piston rods 70 forming part of a second drive for the programming drums 34, 36. The piston rods 70 for the worms 52, 54 are respectively connected to pistons 74b, 74a which are reciprocable in cylinders 72b, 72a. The admission and escape of gaseous or liquid pressure medium from the cylinders 72a, 72b is controlled by suitable regulating valves 31 and 33 which each connected through pipes 35, 37 and 35a, 37a respectively with one of the two chambers of a cylinder unit 72a and 72b respectively, and which are also connected to pressure lines 39 and 39a respectively and also to return lines 41 and 41a respectively of a hydraulic pressure unit and a storage tank 43a.

The regulating valves 31 and 33 are operated by means of operating members 29 acting upon regulating valves. Said operating members 29 being actuated by cam disks 45 and 45a, which are fastened by means not shown on shafts 44 and 46 of programming drums 34 and 36, each carry a pair of control cams 47 and 47a respectively which upon the rotation of the shafts 44, 46 operate successively the operating members 29 of the regulating valves in such a manner that the pressure medium alternatively enters in the one or the other chamber of one cylinder unit, enters and effects the desired motion of the worms 52 and 54 respectively.

The programming drums 34, 36 together carry a total of six cams 76, one for each of the tools 86. Each of these cams resembles a body of concavo-convex shape which conforms to the outline of the peripheral portion of the respective programming drum, see particularly FIG. 4. The distribution of cams 76 on the drums 34, 36 is such that, when the follower 40 has completed the tracking of a cam 76 on the drum 34, the follower 72 will begin to track one of the cams 76 on the drum 36, and vice versa. In other words, the tracking member 38 is rocked alternatively by the cams 76 on the drums 34, 36 to thereby effect movement of the slide 28 from starting position to a desired additional position, depending on the distribution and sequence of cams on the drums 34, 36.

The coupling between each cam 76 and the corresponding programming drum 34, 36 is constructed in such a way that the cams can be readily adjusted axially and circumferentially of the peripheral surface of the respective drum. As shown in FIGS. 3 and 4, the periphery of each drum is formed with axially extending T-grooves 78 which may receive the heads of coupling bolts 80 in such a way that each bolt is slidable in the axial direction of the corresponding drum. The stems of bolts 80 extend into and through elongated slots 82 provided in the cams 76, and each slot 82 extends in the circumferential direction of the respective programming drum. The means for fixing the cams 76 in selected positions of adjustment comprises screws or similar fasteners 81 which may mesh with the bolts 80 and, when driven home, press the cams 76 against selected portions of the peripheral surfaces on the drums 34, 36. The length of each slot 82 preferably at least approximates but normally equals or exceeds the distance between a pair of adjoining T-grooves 78. The peripheral surfaces of the drums 34, 36 are preferably provided with graduations 83 which facilitate the work of an operator who is in charge of preparing a new setup by distributing the cams 76 in accordance with a predetermined operating schedule.

The operation of the machine tool shown in FIGS. 1 to 5 is as follows:

The distribution of cams 76 on the programming drums 34, 36 is selected in such a way that each of the six tools 86 on the turret head 84 can be fed through a distance of accurately determined length. This is achieved by fixing the cams 76 in predetermined axial and angular positions. The rate of feed will be determined by the r.p.m. of the worm shaft 56 and by the inclination of cam faces 76a on the cams 76. The length of the cam faces 76a (as seen in the circumferential direction of the programming drum 34 or 36) will determine the length of feed strokes. The distribution of cams 76 is always such that, once the follower 40 is disengaged from a cam 76 on the drum 34, the follower 42 will be moved by spring 27 into immediate engagement with the next-following cam 76 on the drum 36, and vice versa. Thus, the tracking member 38 invariably transmits motion which is imparted thereto first by a cam 76 on the drum 34, thereupon by a cam 76 on the drum 36, then again by a cam 76 on the drum 34, and so forth, until each of the selected tools 86 has been fed into engagement with the workpiece 84b.

When the follower 40 reaches the end of the cam face 76a on a cam 76 of the drum 34, the second drive is automatically set in motion and rapidly rotates the drum 34 through such an angle that the follower 40 is immediately (practically instantaneously) disengaged from the cam and the follower 42 is free to follow the bias of the spring 27 and to immediately engage the next-following cam 76 on the drum 36. The second drive rotates the programming drum 34 through the intermediary of the cylinder 72a, piston 74a, corresponding piston rod 70 and shifting lever 62, and worm 54. Thus, when the worm 54 is caused to rapidly move in the direction of the arrow 54a shown in FIG. 5, the worm 54 moves axially of the worm shaft 56 and rotates the drum 34 at a speed which exceeds the relatively low speed transmitted by the worm shaft 56. Such rapid rotation of the drum 34 insures that the follower 40 leaves the cam face 76a of the corresponding cam 76 on the drum 34 by moving at a speed which considerably exceeds the speed imparted by the worm shaft 56 alone. Consequently, the length of the interval between engagement of the follower 40 with a cam face 76a on the drum 34 and engagement of the follower 42 with a cam face 76a on the drum 36 is reduced to a minimum and depends solely on the axial distance between consecutive cam faces 76a as well as on the strength of the return spring 27. This reduces the length of intervals between consecutive feed movements of the slide 28 to a minimum and insures that the tools 86 may be put to use in rapid sequence. Also, and since the programming unit comprises two drums 34, 36, each of the cams 76 may extend circumferentially through an angle of nearly 360 degrees. The turret 84 may be indexed during movement of the follower 42 into engagement with a cam face 76a on the drum 36.

The important advantages of the second drive will be readily understood by referring to FIG. 4 wherein the follower 42 is illustrated in a position when it has completed the tracking of a cam face 76a on the drum 36. In order to allow for movement of the tracking member 38 in the axial direction of the drums 34, 36, the drum 36 must be rotated by a distance at least equaling the radius of the follower 42. The time required for such movement of the drum 36 is reduced by the drive which includes the cylinder 72b and piston 74b of FIG. 5 because the injection of pressure fluid into the right-hand chamber of the cylinder 72b can be completed practically instantaneously so that the cam 76' shown in FIG. 4 can be moved out of the way with a minimal delay and allows for immediate engagement of the follower 40 with the next-following cam 76 on the drum 34.

When one of the cylinders 72a, 72b effects rapid rotation of the corresponding programming drum, the other cylinder receives pressure fluid at the opposite side of its piston so that the corresponding worm 52 or 54 is rapidly returned to its initial axial position. The valves 31 and 33 are operated through the cams 47, 47a which act upon the operating members 29. The operation being such that in the respective cylinder unit the piston is first moved in one direction and then in the opposite direction whereupon the respective worm will be shifted in the one and then the opposite direction which latter motions turn the drum first in one rotational direction and then in the opposite rotational direction by a predetermined angle.

The cams 76 on the drums 34, 36 are preferably distributed in such a way that, when the follower 40 leaves the face 76a on a cam 76 of the drum 34, the follower 42 is in axial alignment with the leading end of the cam faces 76a on a cam 76 of the drum 36.

The pistons 74a, 74b of the second drive for the programming drums 36, 34 perform the additional important function of limiting the extent of axial movement of the worms 54, 52. It will be noted that the cylinder-and-piston units 72a, 74a and 72b, 74b are indirectly connected with the respective programming drums.

FIG. 6 illustrates a modified turret lathe wherein a frame or base 112 comprises elongated ways 110 for a reciprocable slide 108 which carries an indexible turret head 114 for a set of six circumferentially distributed tools 116. The slide 108 is provided with a toothed rack 106 which meshes with the arcuate segment 104 of a composite feeder 100. The feeder 100 includes a carrier 100a which is rockable about the axis of a fixed pivot pin 102 and supports a plurality of tracking members 128 each of which resembles a bell crank lever and is rockable about the pin 102. One arm of each tracking member 128 carries a roller follower 130 and the other arm carries an abutment in the form of an adjustable screw 132 which bears against one of two plate-like projections or stops 134, 136 provided on the carrier 100a. Each follower 130 can track one of six cams 118–123 provided on two coaxial programming shafts 124, 126. Each of these programming shafts carries three cams and the cams are distributed in such a way that, when one of the followers 130 on the tracking members 128 reaches the end of a cam on the shaft 124, another follower 130 is ready to move into engagement with a cam on the shaft 126 or vice versa. The return spring which biases the slide 108 to starting position and which causes one of the followers 130 to track the face of the corresponding cam on the shaft 124 or 126 is indicated by the numeral 107. This spring 107 tends to move the slide 108 in a direction to the right, as viewed in FIG. 6.

The purpose of the abutment screws 132 is to allow for rapid adjustment of the length of feed strokes of the slide 108 without necessitating detachment of the cams 118–123. When the follower 130 of the leftmost tracking member 128 shown in FIG. 7 reaches the end of the face on the cam 118, the spring 107 compels the follower 130 on the tracking member 128 for the cam 119 on the programming shaft 126 to engage the face of the cam 119. The cam 120 on the shaft 124 is engaged when the cam 119 has completed the rocking of the carrier 100a, and so forth, i.e., the carrier 100a receives motion alternatively from the cams on the shafts 124 and 126.

The carrier 100a is provided with a bearing sleeve 138 which is rotatable on the pivot pin 102 and the stops 134, 136 extend from the carrier 100a toward and beyond the opposite axial ends of the sleeve 138. The two sets of tracking members 128 are provided with bearing sleeves 140, 142 which are rotatable on the pin 102 at the opposite axial ends of the bearing sleeve 138.

The shafts 124, 126 are normally rotated by a first drive which includes two worm wheels 144 (see FIG. 8) and two worms 146. Each worm 146 forms part of a worm shaft 148 (see FIGS. 9 and 10) which is driven by a transmission in the same way as described in connection with FIGS. 1 to 5. The shaft 148 is rotatable in bearings 150, 152 and comprises a trunnion 154 which is coupled to a piston rod 156. The piston rod 156 is attached to a piston 158 which is reciprocable in a double-acting cylinder 160.

While a follower 130 tracks the face of the cam 118 on the programming shaft 124, the worm shaft 148 for the programming shaft 124 is driven at a constant speed which is dependent on the rotational speed of the workpiece 103 in the chuck 105. When the follower 130 reaches the tip 162 at the end of the face 118a on the cam 118, the right-hand chamber of the cylinder 160 receives a jet of pressure fluid and rapidly shifts the piston 158 in a direction to the left, as viewed in FIG. 9, so that the piston 158 assumes the end position shown in FIG. 10. Such rapid shifting of the piston 158 causes the worm 146 to move into abutment with the bearing 152 and the programming shaft 124 is rotated at a high speed to rapidly move the tip 162 of the cam face 118a away from the corresponding follower 130 so that the latter can move to the position 130' whereby another follower 130 can engage the face of the cam 119 on the programming shaft 126. During such movement of the follower 130 to the position 130', the spring 107 rapidly returns the slide 108 to starting position.

It will be seen that the machine of FIGS. 6–10 is clearly analogous to the machine of FIGS. 1 to 5 with the important exception that the programming drums 34, 36 are replaced by a pair of coaxial programming shafts 124, 126 and that the length of feed strokes of the slide 108 may be varied without necessitating any adjustments in the position of the cams 118–123. The piston 158 for the shaft 124 is caused to return to its initial position while the piston 158 for the shaft 126 causes the latter to rapidly move one of its cams 119, 121, 123 out of engagement with the corresponding follower 130. In this embodiment of our invention, the cylinder-and-piston units 158–160 are directly coupled to the respective worm shafts 148.

Figure 12:
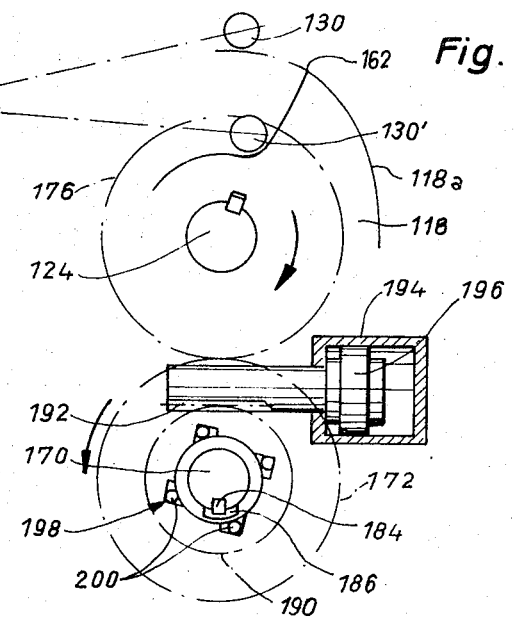
FIG. 12 is a section substantially as seen in the direction of arrows from the line 12—12 of FIG. 11.

Referring finally to FIGS. 11 and 12, there is shown a portion of a third machine tool wherein the programming unit is very similar to the one shown in FIGS. 6–10. The programming shafts 124, 126 respectively carry cams 118, 120, 122 and 119, 121, 123. These shafts further carry spur gears 176, 178 which respectively mesh with spur gears 172, 174 provided on a drive shaft 170. The shaft 170 is parallel with the programming shafts 124 and 126 and carries a worm wheel 180 which meshes with a worm 182. The shaft of the worm 182 is driven by the transmission of the machine tool so that it rotates at a constant speed which is determined by the r.p.m. of the workpiece. The parts 180, 182 constitute a first drive for the programming shafts 124, 126. The second drive for these shafts includes a pair of pinions 190 which are provided on the hubs of gears 172, 174 and mesh with toothed racks 192. Each of these racks 192 constitutes the piston rod of a piston 196 which is reciprocable in a double-acting cylinder 194, see FIG. 12. The driving connection between the hub of the gear 172 and the corresponding pinion 190 comprises a one-way clutch 198 having sprags 200 or analogous motion transmitting elements which will rotate the gear 172 when the pinion 190 is rotated in one direction and at a speed which exceeds the speed of the drive shaft 170. In order to avoid interference with the operation of the worm drive 180, 182, the coupling between the gear 172 and drive shaft 170 comprises an axially extending key 184 which is received in a slot 186. The width of the slot 186, as seen in the circumferential direction of the drive shaft 170, exceeds the width of the key 184 so that the gear 172 may be rotated with reference to the shaft 170 through an angle which corresponds to the stroke to the piston 196 in the cylinder 194.

The mounting of the second pinion 190 on the second gear 174 is analogous, and the pinion 190 which cooperates with the gear 174 can be rotated by a second cylinder-and-piston unit of the type shown in FIG. 12. The gears 176, 178 are rigidly affixed to the respective programming shafts.

When a follower 130 reaches the tip 162 of the corresponding cam face 118a, the second drive including the unit 194, 196 of FIG. 12 is set in operation to rapidly rotate the gear 172 (and hence the gear 176) so that the programming shaft 124 temporarily rotates at a higher speed and rapidly moves the tip 162 away from the range of the follower 130. The latter is then free to move to the position 130'. The key 184 catches up with the gear 172 when the piston 196 completes its forward stroke and the gear 172 then again rotates at the speed of the worm wheel 180. The piston 196 can perform a return stroke without interfering with the worm drive 180, 182 because the clutch 200 is a one-way clutch and because the width of the slot 186 is selected with a view to allow for such return movement of the pinion 190 without transmitting motion to the gears 172 and 176.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be protected by Letters Patent is:

1. In a machine tool, a component movable between a starting position and a plurality of additional positions; a pair of rotary programming members; cam means provided on each of said programming members and each arranged to effect movement of said component to one of said additional positions; feeder means operatively connected with said component and having follower means arranged to track one of said cam means at a time; means for biasing said component to starting position and for urging said follower means into engagement with one of said cam means; first drive means for rotating said programming members at a first speed during movement of said component from a starting position to an additional position; and second drive means for rotating said programming members independently of each other and at a second speed exceeding said first speed whenever said component assumes one of said additional positions to rapidly disengage said follower means from the respective cam means so that said component may follow the action of said biasing means and the follower means engages another of said cam means, said cam means being positioned in such a way that said follower means is compelled to switch from engagement with the cam means on one of said programming members to engagement with the cam means on the other programming member whenever said one programming member is rotated by said second drive means.

2. A structure as set forth in claim 1, further comprising an indexible turret head mounted on said component, said operative connection between said feeder and said component comprising a rack provided on said component and a pinion provided on said feeder and meshing with said rack.

3. A structure as set forth in claim 1, wherein said second drive means comprises a double-acting cylinder-and-piston unit for each of said programming members.

4. A structure as set forth in claim 1, wherein said programming members are drums rotatable about parallel axes and having peripheral portions supporting the respective cam means, said feeder comprising a tracking portion disposed between said drums and said follower means including a pair of followers mounted on said tracking portion and each arranged to track the cam means on one of said drums.

5. A structure as set forth in claim 4, further comprising coupling means provided on said drums and on said cam means for facilitating adjustment of said cam means in the axial and circumferential direction of the respective drums.

6. A structure as set forth in claim 5, wherein said coupling means comprises axially parallel peripheral grooves provided on said drums, bolts slidably received in said grooves, and fastener means for securing said bolts to the respective cam means.

7. A structure as set forth in claim 6, wherein each of said cam means is of arcuate shape to conform to the outline of the respective peripheral portion and wherein said coupling means further comprises at least one elongated slot provided in each of said cam means and extending in the circumferential direction of the respective drum, said bolts extending into said slots.

8. A structure as set forth in claim 4, wherein said first drive means comprises a worm wheel mounted on each of said drums, a driven worm shaft, and a pair of worms provided on said worm shaft and each meshing with one of said worm wheels.

9. A structure as set forth in claim 8, wherein said worms are movable in the axial direction of said worm shaft and wherein said second drive means comprises means for moving said worms in the axial direction of said worm shaft.

10. A structure as set forth in claim 1, wherein said programming members are constituted by a pair of coaxial programming shafts and wherein said feeder comprises a carrier rockable about a fixed axis and operatively connected with said component and a plurality of tracking members, one for each of said cam means, each tracking member being rotatable with reference to said carrier in one direction and said carrier and said tracking members being provided with cooperating abutment and stop means for rocking said carrier in response to rotation of said tracking members in the opposite direction.

11. A structure as set forth in claim 10, wherein each of said tracking members constitutes a two-armed lever having a first arm supporting a follower which is arranged to track the respective cam means and a second arm supporting one of said abutment means.

12. A structure as set forth in claim 10, wherein each of said tracking members is rotatable about said fixed axis.

13. A structure as set forth in claim 10, wherein said stop means comprises at least one projection rigid with said carrier.

14. A structure as set forth in claim 10, wherein said fixed axis is defined by a stationary pivot and said carrier and said tracking members are provided with bearing sleeves rotatably mounted on said pivot.

15. A structure as set forth in claim 10, wherein said carrier is disposed between two groups of tracking members one of which receives motion from cam means on one of said programming shafts and the other of which receives motion from the cam means on the other programming shaft.

16. A structure as set forth in claim 10, wherein said first drive means comprises a worm wheel on each of said programming shafts, a worm meshing with each of said worm wheels, and a driven worm shaft coaxially secured to each of said worms, each of said worm shafts being reciprocable in the axial direction thereof and said second drive means comprising means for reciprocating said worm shafts.

17. A structure as set forth in claim 16, wherein the means for reciprocating said worm shafts comprises a pair of cylinder-and-piston units.

18. A structure as set forth in claim 10, wherein said first drive means comprises a drive shaft, means for rotating said drive shaft at a constant speed, and gear trains connecting said drive shaft with said programming shafts.

19. A structure as set forth in claim 18, wherein each of said gear trains comprises a gear mounted on and having limited freedom of angular movement with reference to said drive shaft, said second drive means comprising cylinder-and-piston units for rotating said gears with reference to said drive shaft and one-way clutch means interposed between each of said units and the respective gear.

20. A structure as set forth in claim 1, wherein said component is a slide which is reciprocable between said starting position and said additional positions and further comprising an indexible turret head mounted on said slide.

No references cited.

LEONIDAS VLACHOS, *Primary Examiner.*